United States Patent [19]

Wei

[11] Patent Number: 5,243,629
[45] Date of Patent: Sep. 7, 1993

[54] MULTI-SUBCARRIER MODULATION FOR HDTV TRANSMISSION

[75] Inventor: Lee-Fang Wei, Lincroft, N.J.

[73] Assignee: AT&T Bell Laboratories, Murray Hill, N.J.

[21] Appl. No.: 753,491

[22] Filed: Sep. 3, 1991

[51] Int. Cl.[5] .................... H04L 27/04; H04L 27/12; H04L 27/20

[52] U.S. Cl. ........................................ 375/59; 375/38; 375/100; 375/102; 371/37.1; 371/43

[58] Field of Search ................ 375/27, 38, 40, 100, 375/102, 58, 59; 370/69.1, 71, 73; 371/43, 37.1; 455/8

[56] References Cited

U.S. PATENT DOCUMENTS

| | | | |
|---|---|---|---|
| 3,988,679 | 10/1976 | Clarke et al. | 375/102 |
| 4,613,975 | 9/1986 | Aoyagi et al. | 375/102 |
| 4,622,680 | 11/1986 | Zinser | 375/38 |
| 4,715,048 | 12/1987 | Masamura | 375/100 |
| 4,831,636 | 5/1989 | Taniguchi et al. | 375/27 |
| 4,868,851 | 9/1989 | Trinidad et al. | 375/40 |
| 4,890,283 | 12/1989 | Tsinberg et al. | 375/27 |
| 4,903,126 | 2/1990 | Kassatly | 370/69.1 |
| 4,935,940 | 6/1990 | Reindl | 375/100 |
| 4,980,897 | 12/1990 | Decker et al. | 375/38 |

OTHER PUBLICATIONS

Co-pending application V. B. Lawrence et al, Ser. No. 07/611,225 filed Nov. 7, 1990, entitled "Coding for Digital Transmission".
Co-pending application L. -F. Wei, Ser. No. 07/611,200 filed Nov. 7, 1990, entitled "Coded Modulation with Unequal Error Protection".
Co-pending application J. D. Johnston et al, Ser. No. 07/625,349 filed Dec. 11, 1990, entitled "A High Definition Television Coding Arrangement with Graceful Degradation".

Primary Examiner—Curtis Kuntz
Assistant Examiner—Don N. Vo
Attorney, Agent, or Firm—Henry T. Brendzel

[57] ABSTRACT

A high definition television (HDTV) signal is transmitted by a multi-subcarrier transmission scheme in which each subcarrier is used to carry a different class of HDTV information.

24 Claims, 4 Drawing Sheets

TRANSMITTER 100

FIG. 2  RECEIVER 300

4 QAM SIGNAL CONSTELLATION

8 QAM SIGNAL CONSTELLATION

12 QAM SIGNAL CONSTELLATION

16 QAM SIGNAL CONSTELLATION

MULTI-SUBCARRIER MODULATION FOR HDTV TRANSMISSION

BACKGROUND OF THE INVENTION

The present invention relates to the transmission of digital data, particularly the transmission of digital data that represents video signals.

It is generally acknowledged that some form of digital transmission will be required for the next generation of television (TV) technology, conventionally referred to as high definition television, or HDTV. This requirement is due mostly to the fact that much more powerful video compression schemes can be implemented with digital signal processing than with analog signal processing. However, in any HDTV digital transmission system, there are three major areas of concern that have to be addressed: graceful degradation, NTSC (National Television System Committee) co-channel interference and ghost cancellation.

A number of co-pending, commonly assigned United States patent applications disclose various techniques that provide graceful degradation in the reception quality at a TV set location. There are: V. B. Lawrence et al. entitled "Coding for Digital Transmission," Ser. No. 07/611,225, filed on Nov. 7, 1990; L.-F. Wei entitled "Coded Modulation with Unequal Error Protection," Ser. No. 07/611,200, filed on Nov. 7, 1990; J. D. Johnston et al. entitled "A High Definition Television Coding Arrangement with Graceful Degradation," Ser. No. 07/625,349, filed on Dec. 11, 1990; and H. Y. Chung et al. entitled "Multiplexed Coded Modulation with Unequal Error Protection," Ser. No. 07/627,156, filed on Dec. 13, 1990. The Lawrence et al. patent application, for example, teaches the notion of characterizing the HDTV signal into classes of "more important" and "less important" information, which will then use a constellation of non-uniformly spaced signal points. This approach provides unequal error protection, i.e., more error protection for the more important information, and allows a graceful degradation in reception quality at the TV set location because, as the bit-error rate at the receiver begins to increase with increasing distance from the broadcast transmitter, it will be the bits that represent proportionately less of the TV signal information that will be the first affected.

However, although the above-mentioned patent applications teach advantageous techniques for providing unequal error protection to different classes of information, these approaches primarily address the problem of providing graceful degradation for an HDTV signal in a single carrier transmission environment and do not address the problems of NTSC co-channel interference and ghost cancellation.

NTSC co-channel interference is a result of the fact that any HDTV transmission scheme will co-exist with existing NTSC TV transmission schemes and will use the available NTSC frequency spectrum, or channel assignments. For example, in the New York City geographical area an HDTV television station may be assigned to broadcast on channel 3. However, there may also be an NTSC television station assigned to channel 3 in a neighboring geographical area such as Philadelphia. As a result, there will be parts of New Jersey that receive both the HDTV and NTSC television signals assigned to channel 3. This results in a geographical region of overlap of the NTSC and HDTV transmission signals in which the NTSC and HDTV signals interfere with each other. To reduce the interference from the HDTV signal to the existing NTSC signal, the transmitted power of the HDTV signal should be set at a value at least 10 dB below that of the NTSC signal so that the HDTV signal does not interfere with the NTSC signal. As a result, the HDTV signal is even more susceptible to interference from the NTSC signal. This NTSC interference must be reduced in order to ensure that the coverage area of the HDTV signal is large enough.

Finally, there is the problem of ghost cancellation. In any TV transmission scheme, reflection of the transmitted signal may occur that results in ghosting, which generally manifests itself in the form of double images. However, the problem of ghosting is compounded in an HDTV transmission scheme because of the use of compression algorithms to squeeze a full-bandwidth HDTV signal, e.g., 800M bits/sec., into an NTSC 6 MHz channel. This necessitates the use of a complex equalizer to cancel the ghost images in an HDTV transmission scheme.

Before proceeding with a description of an illustrative embodiment, it should be noted that the various digital signaling concepts described herein—with the exception, of course, of the inventive concept itself—are all well known in, for example, the digital radio and voiceband data transmission (modem) arts and thus need not be described in detail herein. These include such concepts as multidimensional signaling using 2N-dimensional channel symbol constellations, where N is some integer; trellis coding; fractional coding; scrambling; passband shaping; equalization; Viterbi, or maximum-likelihood, decoding; etc.

SUMMARY OF THE INVENTION

In accordance with the invention, a signal is divided into a plurality of classes of information which are encoded for different error protection levels. Each class of information is then modulated into a subchannel of the channel assigned to the signal. To further enhance signal reception, the subchannel assignments are based on noise and interference considerations.

The signal is separated into a plurality of classes of information such that at least one class of information is "more important" and is provided with more error protection than the remaining classes of information. The plurality of classes of information are then frequency division multiplexed such that each class of information is modulated by a subcarrier into a subchannel within a frequency band.

In accordance with a feature of the invention, the effect of the NTSC co-channel interference is reduced by assigning the subchannel that carries the more important information to a frequency spectrum portion that is not subject to substantial NTSC interference. As a result, the more important data of the HDTV signal can still be recovered even in a fringe area where substantial NTSC co-channel interference is present.

In accordance with another feature of the invention, the use of multiple subcarriers results in longer symbol intervals and a flatter frequency response in each of the subchannels. As a result, a simpler equalizer can be used in the HDTV receiver to mitigate the effects of "ghosting."

DETAILED DESCRIPTION

In accordance with the principles of my invention, all three of the above-mentioned areas of concern in HDTV transmission are addressed. The signal is divided into a plurality of classes of information and each class of information is encoded to a different level of error protection. Each class of information is then modulated into a subchannel of the channel assigned to the signal.

Figure 1:
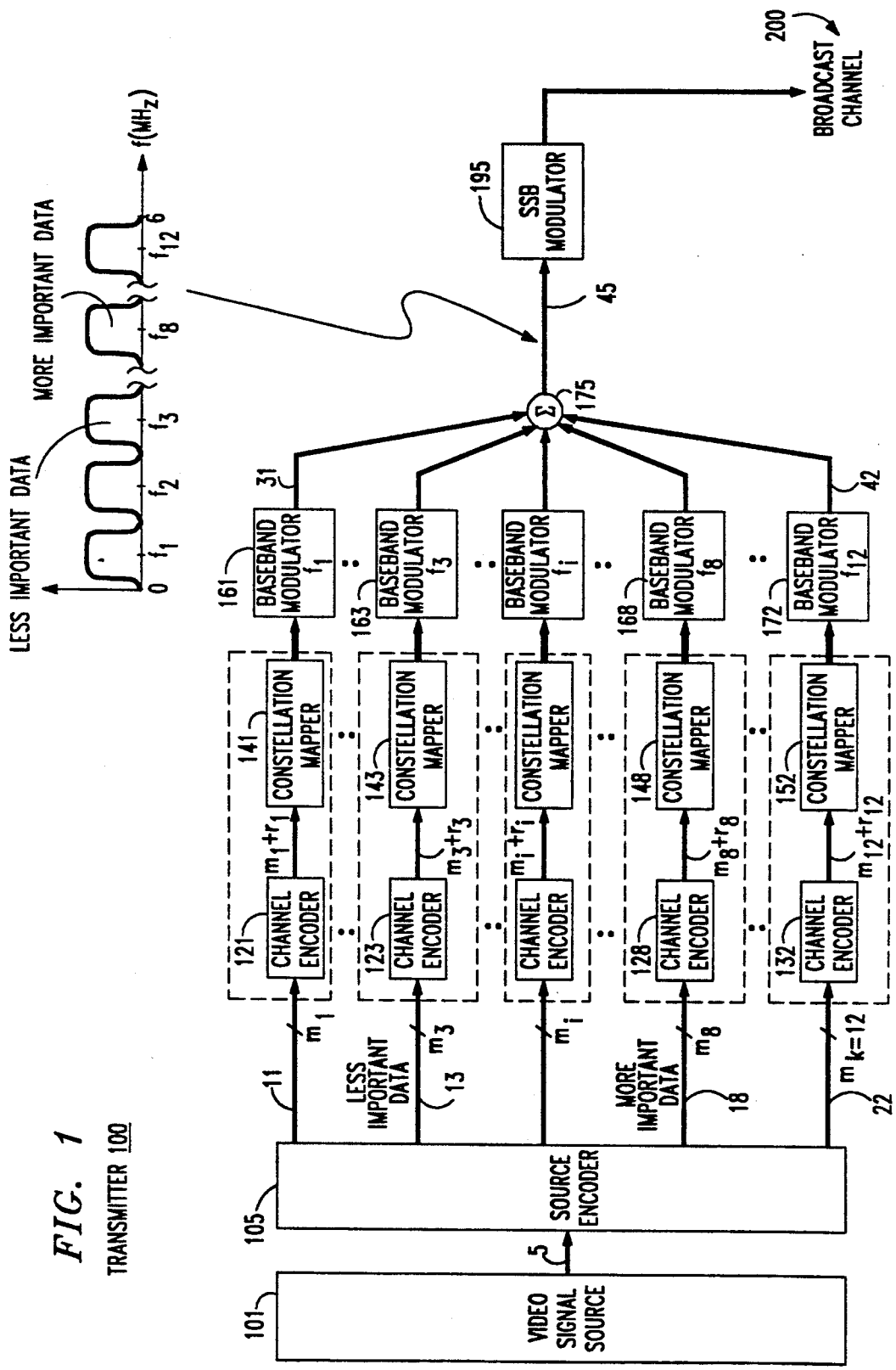
FIG. 1 is a block diagram of a transmitter embodying the principles of the invention.

Turning to FIG. 1, video signal source 101 generates an HDTV analog video signal representing picture information. As taught in the Lawrence et al. patent, this HDTV analog video signal is passed on to source encoder 105, which generates a digital signal comprising a plurality of "classes of information" in which at least one class of information is more important, i.e., contains "more important data," than the remainder of the classes of information that, therefore, contain "less important data." For example, the more important data represents that information which is more important for reception of the information signal. In an HDTV signal, it is that information, which, if properly received, will form a rough picture, e.g., audio information, framing information, etc., and the less important data represents the information that comprises the remainder of the HDTV signal. As represented herein, source encoder 105 illustratively provides k=12 classes of information with the class of information on lead 18 being "more important" than the other classes of "less important" information on the remaining leads, e.g., leads 11, 13 and 22. Illustratively, each class of information comprises a plurality of data bits, with an average of $m_i$ bits, $1 \leq i \leq 12$, being generated on each lead for each signaling interval, which is of duration T seconds.

From FIG. 1 it can be seen that each class of information, which is represented by $m_i$ bits, is processed by a channel encoder, a constellation mapper and a baseband modulator. For simplicity, the operation of transmitter 100 will be described, for the moment, in the context of the more important information on lead 18. A similar description would apply to the processing of each of the other classes of information. The more important information, which is represented by $m_8$ bits on lead 18, is input to channel encoder 128. The latter operates in accordance with known encoding techniques, such as trellis coding, and provides $m_8 + r_8$ data bits as output, where $r_8$ represents the average number of redundant bits introduced by channel encoder 128 in each signaling interval. (It should be noted that error correcting codes, such as a Reed-Solomon code, can also be used in place of, or in conjunction with, a coded modulation scheme.) The encoded output of channel encoder 128 is mapped, by constellation mapper 148, to a signal point, taken from a signal point constellation, in each signaling interval. It is assumed that the signal point constellation is representative of well-known uniformly-spaced QAM constellations such as is shown in FIGS. 5 to 8 for 4, 8, 12 and 16 signal point constellations.

Channel encoder 128 and constellation mapper 148, taken together, implement a particular coded modulation scheme that provides error protection to the more important class of information. The various coded modulation schemes that are implemented by the plurality of channel encoders, e.g., 121, 123, 128, 132, etc., and respective constellation mappers, 141, 143, 148, 152, etc., are chosen to provide unequal error protection to the plurality of classes of information such that the more important information is provided with more error protection. Unequal error protection can be implemented in a number of ways, such as different channel encoders, different constellations sizes and/or different symbol rates for the various channel encoders and constellation mappers. For example, referring to FIG. 1, all of the channel encoders can be identical. The signal constellation of constellation mapper 148 has, however, the smallest size compared to those of the other constellation mappers. For example, the constellation used by constellation mapper 148 is the 4-QAM of FIG. 5, while the 8-QAM, 12-QAM and 16-QAM of FIGS. 6-8 can be used by the other constellation mappers. This assumes that the transmitted power for each subcarrier is the same, with the result that there is more separation between the signal points of the 4-QAM constellation of FIG. 5 (i.e., the spacing between the signal points), than in the constellations of FIGS. 6-8. Consequently, there is more error protection for the more important data, i.e., this provides unequal error protection for, and allows graceful degradation of, the HDTV signal.

Figure 3:
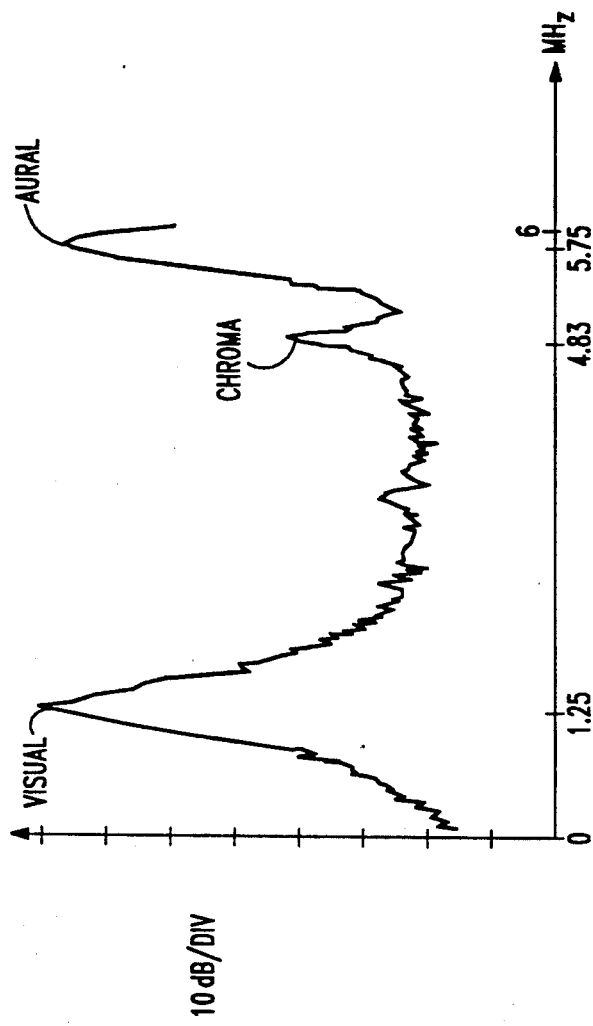
FIG. 3 is the frequency spectrum for an NTSC signal.
Figure 4:
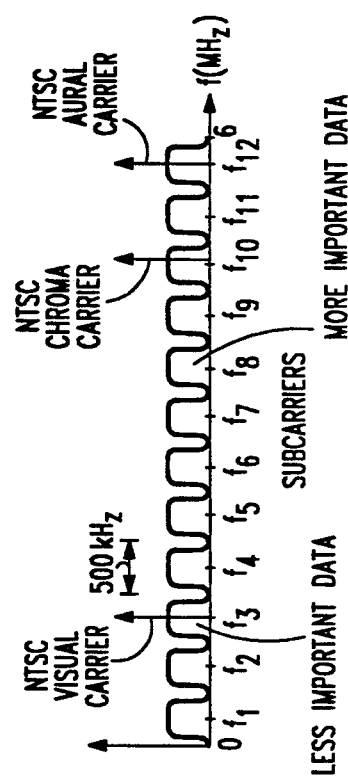
FIG. 4 is the frequency spectrum for an HDTV signal embodying the principles of the invention.
Figure 5:
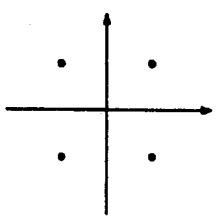
FIGS. 5-8 are illustrative 4, 8, 12 and 16 QAM signal constellations, respectively.
Figure 6:
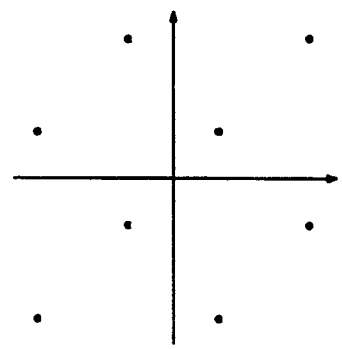
Figure 7:
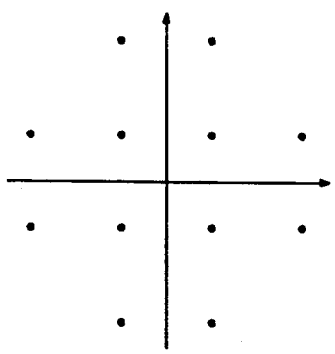
Figure 8:
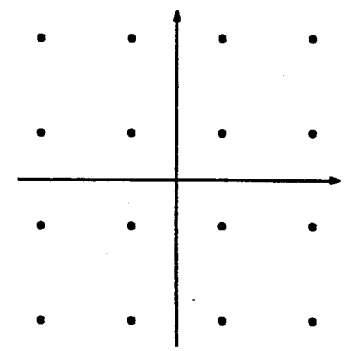

Before proceeding, reference should be made to FIG. 3, which is a representative frequency spectrum for an illustrative NTSC analog TV baseband transmission signal that has a bandwidth of 6 MHz. (Although reference is made to the baseband signal, the actual transmitted signal is modulated to the respective frequency spectrum for a particular assigned channel. For example, channel 3 is transmitted in the frequency spectrum of 60 to 66 MHz.) In accordance with the invention, this 6 MHz NTSC bandwidth is divided into a number of subchannels, each subchannel assigned to one of a number of classes of information, which represent the HDTV signal. For the purpose of illustration, as shown in FIG. 4, the NTSC bandwidth is divided into 12 subchannels, with each subchannel having a bandwidth equal to 500 Khz, i.e., the NTSC bandwidth divided by the number of subchannels. Referring now back to FIG. 1, the HDTV signal is similarly divided into 12 classes of information. The output from each of the constellation mappers, e.g., 141, 143, 148, 152, etc. is provided to respective baseband modulators 161, 163, 168, 172, etc. The latter frequency modulates each of the encoded classes of information to a respective subcarrier, $f_i$ (where $1 \leq i \leq 12$), such that each class of information is now provided in a respective subchannel. The outputs of the baseband modulators, e.g., 161, 163, 168, 172, etc., are summed, or frequency division multiplexed, by adder 175. The output of adder 175 is transmitted by single sideband (SSB) modulator 195. The latter is representative of conventional SSB modulation circuitry, e.g., oscillator, antenna, etc., and provides a broadcast HDTV signal to broadcast channel 200.

From FIG. 3, it can be seen that the energy of the NTSC transmission signal is generally concentrated in those frequency regions that contain the visual, chroma and aural carriers, at 1.25 MHz, 4.83 MHz and 5.75 MHz, respectively. As a result, any co-existing HDTV transmission signal in these frequency regions is subject to substantial interference. Therefore, and in accordance with a feature of the invention, the effect of NTSC co-channel interference can be reduced by assigning the more important information to a subchannel that is different from the subchannels that are subject to substantial interference from the NTSC visual, chroma and aural carriers. This is shown in FIG. 1, where the more important information is transmitted on subcarrier $f_8$, thereby avoiding the subchannels that are subject to substantial interference from the visual, chroma and aural carriers of the NTSC transmission signal, e.g., the subchannels associated with subcarriers $f_3$, $f_{10}$, $f_{12}$, etc. By avoiding those parts of the frequency spectrum of the NTSC transmission signal from which substantial interference is expected, the more important information is provided with more error protection than those classes of information that are assigned to those subchannels that overlap with the visual, chroma and aural carriers of the NTSC transmission signal. This additional error protection occurs even if all of the classes of information have the same encoding schemes. In addition, if an error occurs in those subchannels to which the less important information has been assigned, that information can simply be ignored by an HDTV receiver. For example, from FIG. 1, the less important information is assigned to subcarrier $f_3$, which is strongly interfered with by the visual carrier of the NTSC transmission signal. As a result, when an error occurs on this subchannel the less important information is ignored by the receiver. It should also be noted that those subchannels that experience substantial interference from the visual, chroma and aural carriers of the NTSC transmission signal can be intentionally left unused.

In accordance with another feature of the invention, the use of multiple subcarriers results in longer symbol intervals and a flatter frequency response in each of the subchannels. As a result, a simpler equalizer can be used in the HDTV receiver to mitigate the effects of ghosting. Further, a larger symbol interval provides more protection against noise spikes of short duration since fewer symbols would be effected.

Figure 2:
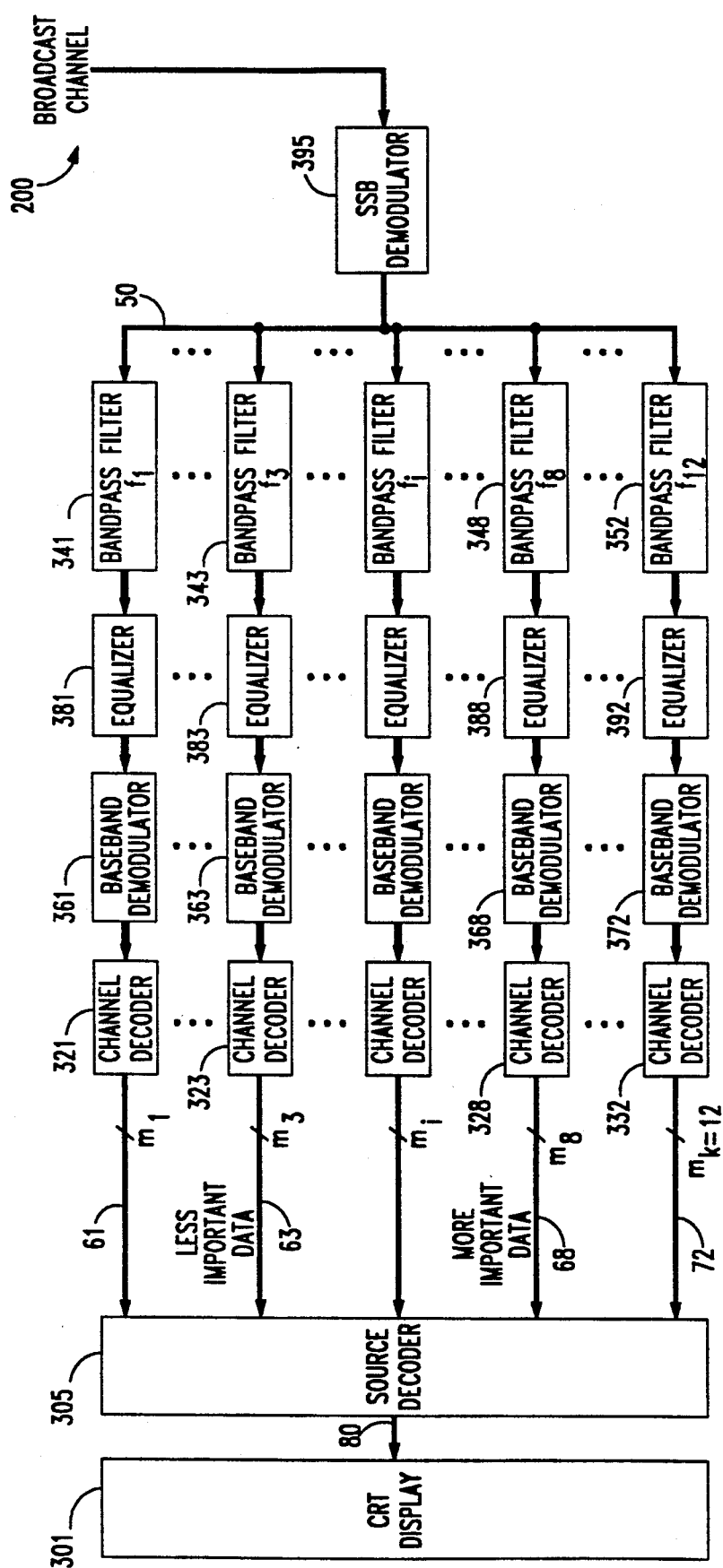
FIG. 2 is a block diagram of a receiver embodying the principles of the invention.

Turning to the HDTV receiver of FIG. 2, the broadcast HDTV signal is received from broadcast channel 200 by receiver 300. The broadcast HDTV signal is received by SSB demodulator 395, which is representative of conventional reception and demodulation circuitry, e.g., the antenna, local oscillator, mixer, etc. SSB demodulator 350 provides a frequency multiplexed signal to each one of the plurality of bandpass filters, e.g., 341, 343, 348, 352, etc. For example, bandpass filter 348 filters out subcarrier $f_8$, which contains the more important information. This subcarrier is applied to equalizer 388 to compensate for intersymbol interference. The output of equalizer 388 is then provided to baseband demodulator 368, which provides a digital signal representing the received coded output to channel decoder 328. The latter decodes the received coded output to provide the more important data, on lead 68, to source decoder 305. Similarly, each of the other classes of information is decoded by receiver 300 through the respective demodulation and decoding circuitry. Source decoder 305 provides the inverse function of source encoder 105, of transmitter 100. Specifically, source decoder 305 takes into account the subchannel that each class of information is assigned to in a predetermined manner. For example, in order to recreate the analog HDTV signal, source decoder 305 knows a priori that the more important information is received on lead 68. As a result, source decoder 305 combines the various classes of information to provide the received analog HDTV signal to CRT display 301.

The foregoing merely illustrates the principles of the invention and it will thus be appreciated that those skilled in the art will be able to devise various alternative arrangements, which, although not explicitly described herein, embody the principles of the invention and are within its spirit and scope.

For example, as described hereinabove, all of the coded modulation schemes could be the same. Different symbol rates, or subchannels with different frequency bandwidths, could be used for the various classes of information. The use of a smaller symbol rate for the more important information would further mitigate the effects of ghosting, and hence provide more error protection for the more important data.

Also, it should be observed that one subchannel can be used to carry other information in addition to the plurality of classes of information of the HDTV signal. For example, a subchannel with a fixed coding and modulation format, which carries the more important information, can be used to transmit information as to the coding and modulation formats used on the other subchannels so that, illustratively, a variable bit rate can be used for each of class of information.

In addition, more than one class of information may be carried by each subchannel and a nonuniformly-spaced signal point constellation can also be used. Alternatively, more than one constellation may be used by each subchannel, each constellation being for one class of information and this constellation being time-division-multiplexed.

It may also be noted that the number of subcarriers used is not restricted to twelve but can be any number greater than one. Further, the implementation of the frequency division multiplexed scheme can include overlapping of the spectra of different subcarriers and/or different modulation schemes. Also, other communications system components can be used as well, such as an interleaver to protect against bursty noise. In addition, although the invention is illustrated herein as being implemented with discrete functional building blocks, e.g., trellis encoders, constellation mappers, etc., the functions of any one or more of those building blocks can be carried out using one or more appropriate programmed processors, digital signal processing (DSP) chips, etc.

I claim:

1. A method for processing an information signal comprising the steps of
    separating the information signal into a plurality of classes of information such that at least one of the plurality of classes of information is more important for reception of the information signal than the other ones of the plurality of classes of information,
    encoding the plurality of classes of information to provide a plurality of encoded symbols such that the more important information has more error protection than the remaining ones of the plurality of classes of information, and
    modulating the plurality of encoded symbols into a plurality of subchannels within a frequency band, each subchannel occupying a different frequency spectrum.

2. The method of claim 1 wherein the frequency band is assigned to a different signal.

3. The method of claim 2 wherein the modulating step place the more important information into a subchannel that does not contain a carrier of the different signal.

4. The method of claim 1 wherein the encoding step includes the steps of
channel encoding each one of the plurality of classes of information to provide a plurality of encoded outputs, and
mapping each one of the plurality of encoded outputs to signal constellation to provide the plurality of encoded symbols.

5. The method of claim 4 wherein the channel encoding step for the more important information is different from the channel encoding step of at least one other of the plurality of classes of information.

6. The method of claim 5 wherein the channel encoding step operates in accordance with an error correcting code.

7. The method of claim 5 wherein the channel encoding step operates in accordance with coded modulation.

8. The method of claim 5 wherein the channel encoding step operates in accordance with coded modulation and an error correcting code.

9. The method of claim 4 wherein the mapping step for the more important information uses a signal point constellation that is different from at least one other of the signal point constellations used for the other plurality of classes of information.

10. The method of claim 1 wherein the encoding step uses a symbol rate for the more important class of information that is different from the symbol rate of a least one other class of information.

11. A method for transmitting a first signal in a frequency band allocated to a second signal comprising the step of
dividing the frequency band into a number of subchannels,
separating the first signal into a plurality of classes of information such that at least one of the plurality of classes of information in more important for reception of the information signal than the other ones of the plurality of classes of information, and
assigning the more important information to a subchannel that is different from those subchannels that are subject to substantial interference from the second signal.

12. The method of claim 11 wherein the assigning step includes the steps of
encoding each one of plurality of classes of information, and
frequency modulating the encoded plurality of classes of information to the respective subchannel.

13. The method of claim 11 wherein the first signal is a High Definition Television signal, the second signal is a National Television System Committee signal, and the more important information is assigned to a subchannel that is different from those subchannels that are subject to substantial interference from the visual, chroma or aural carriers of the National Television System Committee signal.

14. A method for transmitting a first signal in a frequency band allocated to a second signal comprising the steps of
dividing the frequency band into a number of subchannels,
separating the first signal into a plurality of classes of information such that at least one of the plurality of classes of information is more important than the other ones of the plurality of classes of information for reception of the information signal, and
assigning the more important information to a subchannel that does not contain a carrier of the second signal.

15. The method of claim 14 wherein the first signal is a High Definition Television signal, the second signal is a National Television System Committee signal, and the more important information is assigned to a subchannel that is different from those subchannels that contain the visual, chroma or aural carriers of the signal.

16. A method for processing a signal, the signal being comprised of a plurality of subchannels, each subchannel carrying a class of information, with one subchannel carrying the more important information, said plurality of subchannels occupying a frequency band that is assigned to a different signal, with the subchannel that is carrying the more important information being different from those subchannels that are subject to substantial interference from the different signal, the method comprising the steps of
receiving the signal,
filtering the received signal to provide the plurality of subchannels,
demodulating each one of the received plurality of subchannels to provide a plurality of received encoded symbols,
decoding each one of the plurality of received encoded symbols to provide the plurality of classes of information, and
combining each one of the plurality of classes of information in a predetermined manner, which takes into account which subchannel carried the more important information, to recreate the information signal.

17. Apparatus for processing an information signal comprising
means for separating the information signal into a plurality of classes of information such that at least one of the plurality of classes of information is more important than the other ones of the plurality of classes of information for reception of the information signal,
means for providing unequal levels of error protection to the plurality of classes of information to provide a plurality of encoded symbols for each one of the plurality of classes of information such that the more important information has more error protection than the remaining ones of the plurality of classes of information, and
means for modulating the plurality of encoded symbols for each one of the plurality of classes of information to a plurality of subchannels within a frequency band, each subchannel occupying a different frequency spectrum.

18. The apparatus of claim 17 wherein the frequency band is assigned to a different signal.

19. The apparatus of claim 18 wherein the means for modulating places the more important information into a subchannel that does not contain a carrier of the different signal.

20. The apparatus of claim 17 wherein the means for providing unequal error protection further comprises
channel encoding means for each one of the plurality of classes of information to provide a plurality of encoded outputs, and means for mapping each one of the plurality of encoded outputs to a signal constellation to provide the plurality of encoded symbols.

21. The apparatus of claim 20 wherein the channel encoding means for the more important information is different from the channel encoding means of at least one other of the plurality of classes of information.

22. The apparatus of claim 20 wherein the means for mapping the more important information uses a signal point constellation that is different from at least one other of the signal point constellations used for the other plurality of classes of information.

23. The apparatus of claim 17 wherein the means for providing unequal error protection uses a symbol rate for the more important class of information that is different from the symbol rate of at least one other class of information.

24. Apparatus for processing a signal, the signal being comprised of a plurality of subchannels, each subchannel carrying a class of information, with one subchannel carrying the more important information, said plurality of subchannels occupying a frequency band that is assigned to a different signal, with the subchannel that is carrying the more important information being different from those subchannels that are subject to substantial interference from the different signal, the apparatus comprising means for receiving the signal, means for filtering the received signal to provide the plurality of subchannels, means for demodulating each one of the received plurality of subchannels to provide a plurality of received encoded symbols, means for decoding each one of the plurality of received encoded symbols to provide the plurality of classes of information, and means for combining each one of the plurality of classes of information in a predetermined manner, which takes into account which subchannel carried the more important information, to recreate the information signal.

* * * * *